(12) United States Patent
Markiewicz et al.

(10) Patent No.: US 10,585,585 B2
(45) Date of Patent: Mar. 10, 2020

(54) GLOW TOUCH FEEDBACK FOR VIRTUAL INPUT DEVICES

(71) Applicant: Microsoft Technology Licensing, LLC, Redmond, WA (US)

(72) Inventors: Jan-Kristian Markiewicz, Redmond, WA (US); Manuel Clement, Felton, CA (US); Jason Silvis, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/373,167

(22) Filed: Apr. 2, 2019

(65) Prior Publication Data
US 2019/0294327 A1    Sep. 26, 2019

Related U.S. Application Data

(63) Continuation of application No. 15/413,510, filed on Jan. 24, 2017, now Pat. No. 10,248,312, which is a
(Continued)

(51) Int. Cl.
*G06F 3/0488* (2013.01)
*G06F 3/0484* (2013.01)
(Continued)

(52) U.S. Cl.
CPC .......... *G06F 3/04886* (2013.01); *G06F 3/016* (2013.01); *G06F 3/04842* (2013.01);
(Continued)

(58) Field of Classification Search
CPC ............... G06F 3/0488; G06F 3/04886; G06F 3/03547; G06F 3/016; G06F 1/1671; G06F 3/04842; G06F 3/167
See application file for complete search history.

(56) References Cited

U.S. PATENT DOCUMENTS 5,936,554 A    8/1999 Stanek
6,473,006 B1   10/2002 Yu et al.
(Continued)

FOREIGN PATENT DOCUMENTS

BR    PI0604933 A    10/2007
DE    10218442 B3    1/2004
(Continued)

OTHER PUBLICATIONS

"On Screen", Innovation Management Group, Inc., Aug. 4, 2008, 2 pages.
(Continued)

*Primary Examiner* — Keith Ferguson
(74) *Attorney, Agent, or Firm* — Medley, Behrens & Lewis, LLC

(57) ABSTRACT

The claimed subject matter is directed to providing feedback in a touch screen device in response to an actuation of a virtual unit in a virtual input device. Specifically, the claimed subject matter provides a method and system for providing visual feedback in response to an actuation of a virtual key in a virtual keyboard. One embodiment of the claimed subject matter is implemented as a method for providing luminescent feedback in response to an actuation of a virtual key in a virtual keyboard. User input in a virtual keyboard corresponding to a virtual key is received. The corresponding virtual key is actuated and registered in response to the user input, and a luminescent feedback is displayed to the user as confirmation of the actuation of the virtual key.

20 Claims, 9 Drawing Sheets

Related U.S. Application Data continuation of application No. 14/260,721, filed on Apr. 24, 2014, now Pat. No. 9,588,681, which is a continuation of application No. 12/240,180, filed on Sep. 29, 2008, now Pat. No. 8,750,938.

(51) Int. Cl.
| | |
|---|---|
| *G06F 3/01* | (2006.01) |
| *G06F 3/16* | (2006.01) |
| *H04M 1/22* | (2006.01) |

(52) U.S. Cl.
CPC ............... *G06F 3/167* (2013.01); *H04M 1/22* (2013.01); *H04M 2250/22* (2013.01)

(56) References Cited

U.S. PATENT DOCUMENTS

| | | |
|---|---|---|
| 6,491,630 B1 | 12/2002 | Saccardo et al. |
| 6,803,905 B1 | 10/2004 | Capps et al. |
| 6,906,701 B1 | 6/2005 | Oueslati et al. |
| 7,324,818 B2 | 1/2008 | Gallagher et al. |
| 7,333,031 B1 | 2/2008 | Bantner |
| 7,395,506 B2 | 7/2008 | Tan et al. |
| 7,649,526 B2 | 1/2010 | Ording et al. |
| 8,065,624 B2 | 11/2011 | Morin et al. |
| 8,570,279 B2 | 10/2013 | Ording et al. |
| 8,750,938 B2 | 6/2014 | Markiewicz et al. |
| 8,775,964 B2 | 7/2014 | Hayashi et al. |
| 9,588,681 B2 | 3/2017 | Markiewicz et al. |
| 10,248,312 B2 | 4/2019 | Markiewicz et al. |
| 2002/0118175 A1 | 8/2002 | Liebenow et al. |
| 2004/0046744 A1 | 3/2004 | Rafii et al. |
| 2004/0159779 A1 | 8/2004 | Duff |
| 2004/0198475 A1 | 10/2004 | Kim |
| 2005/0162402 A1 | 7/2005 | Watanachote |
| 2006/0028428 A1 | 2/2006 | Dai et al. |
| 2006/0066589 A1 | 3/2006 | Ozawa et al. |
| 2007/0016792 A1 | 1/2007 | Allen et al. |
| 2007/0035527 A1 | 2/2007 | Cheon et al. |
| 2007/0061750 A1 | 3/2007 | Schultz et al. |
| 2007/0126705 A1 | 6/2007 | Ko et al. |
| 2007/0139382 A1 | 6/2007 | Kotipalli |
| 2008/0098331 A1 | 4/2008 | Novick et al. |
| 2008/0126977 A1 | 5/2008 | Keohane et al. |
| 2008/0290258 A1* | 11/2008 | Cheng .................. G06F 1/1616 250/214 AL |
| 2008/0305836 A1 | 12/2008 | Kim et al. |
| 2009/0002140 A1 | 1/2009 | Higa |
| 2009/0058823 A1 | 3/2009 | Kocienda |
| 2009/0167695 A1 | 7/2009 | Griffin et al. |
| 2014/0237413 A1 | 8/2014 | Markiewicz et al. |

FOREIGN PATENT DOCUMENTS

| | | |
|---|---|---|
| EP | 1793401 A1 | 6/2007 |
| JP | 2004355606 A | 12/2004 |
| WO | 2006052175 A1 | 5/2006 |
| WO | 2006100540 A1 | 9/2006 |
| WO | 2006103947 A1 | 10/2006 |

OTHER PUBLICATIONS

Majaranta, et al., "Auditory and Visual Feedback During Eye Typing", In Proceedings of the ACM Conference on Human Factors in Computing Systems—CHI 2003, 2003, 5 pages.

"KP Typing Tutor 5.0", Retrieved At: <<http://www.bluechillies.com/details/17723.html>>, 2 pages.

"Office Action for U.S. Appl. No. 12/240,180", dated Aug. 5, 2011, 7 pages.

"Response to the Office Action for U.S. Appl. No. 12/240,180", dated Nov. 7, 2011, 11 pages.

"Final Office Action for U.S. Appl. No. 12/240,180", dated Dec. 29, 2011, 10 pages.

"Response to the Final Office Action for U.S. Appl. No. 12/240,180", dated May 31, 2012, 16 pages.

"Office Action for U.S. Appl. No. 12/240,180", dated Sep. 11, 2013, 4 pages.

"Response to the Office Action for U.S. Appl. No. 12/240,180", dated Feb. 11, 2014, 10 pages.

"Notice of Allowance and Fees Due for U.S. Appl. No. 12/240,180", dated Mar. 11, 2014, 5 pages.

"Office Action for U.S. Appl. No. 14/260,721", dated Jun. 26, 2015, 9 pages.

"Response to the Office Action for U.S. Appl. No. 14/260,721", dated Nov. 25, 2015, 9 pages.

"Final Office Action for U.S. Appl. No. 14/260,721", dated Jan. 25, 2016, 10 pages.

"Response to the Final Office Action for U.S. Appl. No. 14/260,721", dated Jun. 14, 2016, 11 pages.

"Office Action for U.S. Appl. No. 14/260,721", dated Jul. 28, 2016, 5 pages.

"Response to the Office Action for U.S. Appl. No. 14/260,721", dated Jul. 31, 2016, 9 pages.

"Notice of Allowance and Fees Due for U.S. Appl. No. 14/260,721", dated Aug. 15, 2016, 5 pages.

"Notice of Allowance and Fees Due for U.S. Appl. No. 14/260,721", dated Dec. 6, 2016, 5 pages.

"Non-Final Office Action for U.S. Appl. No. 15/413,510", dated Sep. 6, 2018, 6 pages.

"Response to the Non-Final Office Action for U.S. Appl. No. 15/413,510", dated Nov. 2, 2018, 3 pages.

"Notice of Allowance and Fees Due for U.S. Appl. No. 15/413,510", dated Dec. 11, 2018, 5 pages.

\* cited by examiner

200

200

200

200

GLOW TOUCH FEEDBACK FOR VIRTUAL INPUT DEVICES

CROSS-REFERENCE TO RELATED APPLICATIONS

This application is a continuation of U.S. patent application Ser. No. 15/413,510, filed on Jan. 24, 2017, and entitled "GLOW TOUCH FEEDBACK FOR VIRTUAL INPUT DEVICES", which is a continuation of U.S. Pat. No. 9,588,681, filed on Apr. 24, 2014, and entitled "GLOW TOUCH FEEDBACK FOR VIRTUAL INPUT DEVICES", which is a continuation of U.S. Pat. No. 8,750,938, filed on Sep. 29, 2008, and entitled "GLOW TOUCH FEEDBACK FOR VIRTUAL INPUT DEVICES", the entireties of which are incorporated herein by reference.

BACKGROUND

A touch screen is a display capable of detecting a physical stimulus or other contact with a foreign object (such as a finger or stylus) within a display area and interpreting the stimulus as input. The ability of a touch screen to receive (i.e., detect and interpret) a stimulus is typically enabled through the use of a plurality of touch-sensitive sensors. Touch-sensitive sensors are devices that respond to a stimulus and produce a signal indicative of the stimulus's magnitude, relative position, or other characteristic attributable to the stimulus. Touch-sensitive sensors may be implemented according to a variety of technologies. Popular touch-sensitive sensor implementations in the field of consumer electronics include resistive sensing, capacitive sensing, infrared sensing, optical imaging and dispersive signal technology. Other technologies exist that are also well known in the art.

Touch screens have become increasingly popular in the field of consumer electronics. Applications in which touch screen applications may be used include display interfaces of computing devices, such as notebook computers (tablets), personal data assistants (PDAs), and mobile handsets. Other popular applications in which touch screens have been incorporated include the user interfaces of bank automated telling machines, kitchen appliances, exercise equipment, satellite navigation devices and other consumer electronics.

Displays which offer touch screen functionality provide substantial benefits over traditional displays. These benefits include the ability to directly interact with the content displayed on the touch screen, rather than indirectly with a dedicated input device, such as a keyboard, keypad, mouse, or touchpad. Another benefit of a touch screen display is the ability to receive input without requiring the presence of a dedicated input device. As consumer electronic devices (particularly mobile handsets) continue to reduce in size, the inclusion of a touch screen provides a manufacturer the ability to further reduce the size of the device by eliminating the space required for an input terminal. In addition, by devoting the entirety of a device's surface area for use as a display rather than apportioning the surface area between a display area and an input terminal (e.g., keypad), the total display area may be increased, resulting in a superior user experience.

One popular implementation of a touch screen is the simulation of an input terminal. A touch screen according to this implementation displays one or more images corresponding to the individual input units of the simulated input terminal. For example, a touch screen simulating a computer keyboard may display a "soft" (virtual) keyboard in the display area. This soft keyboard may be displayed as an image of a physical keyboard. When a stimulus (e.g., finger tap) is detected over the surface of the keyboard image, the stimulus is interpreted as a user-actuation of the key corresponding to the image. Thus, tapping the image of the letter "A" in the image of a soft keyboard is interpreted as though the user typed "A" via a dedicated input terminal.

Unfortunately, mobile computing devices such as cell phones, smart phones and PDAS which use touch screens as a primary method of input may be difficult or inconvenient to use. For example, typical touch screens lack the tactile feedback provided by pressing a tangible button or key in a physical input terminal. Accordingly, users may be uncertain whether any key was actuated at all. Further complicating the issue, the reduced sizes of many mobile computing devices naturally limit the sizes of their respective touch screens. A soft keyboard or soft keypad may be implemented with constituent keys which are tightly spaced and/or inconveniently small. A user pressing a key on a soft keyboard may obscure the visibility of a substantial portion of one or more keys just with the user's fingertip. Errant key presses may also be a common user experience. Thus, in order for the user to be assured that input is being received as intended, the user is required to monitor the output field on the display to verify both that a key was entered, and more specifically, that the correct key was entered.

However, while monitoring the output field, the user may be unable to view the soft keyboard, and must therefore estimate the position of the keys to continue entering text. Novice users in particular may find difficulty in estimating the relative positions of the keys accurately. Looking at the soft keyboard interface solves this problem, but prevents the user from verifying whether a key press was registered by the touch screen, or to view which keys the user has recently pressed, until the user again views the output field. Naturally, the constant diverting of focus between the output field and the soft keyboard may cause inconvenience to the user and inefficient input entry.

One conventional solution to this problem is to provide a feature that increases the size of the image of a key when a stimulus is detected in a static location exceeding a length of time. For example, if a user's finger tip presses a key on a soft keyboard and holds the position of the finger tip over the image of the key over a threshold period of time, the image of the key is adjusted (typically, enlarged) so that the visibility of the key is less obscured to the user by the position of the user's finger.

Unfortunately, while this solution reduces the uncertainty of the identity of the key currently pressed, it does nothing to indicate the identity of the keys previously pressed, and thus does not alleviate the inefficiency caused by requiring the user to divert attention between the output field and the soft keyboard. On the contrary, since the stimulus's position must be maintained to exceed a threshold, an additional delay results each time this feature is employed. A natural result of this delay is a corresponding decrease in efficiency.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The claimed subject matter is directed a method and system for providing glow touch feedback for virtual input devices. The claimed subject matter provides a method for displaying a glow feedback in response to a user input in a touch screen. Another embodiment of the claimed subject matter provides a system for displaying luminescent feedback in response to stimulus.

Glow touch feedback makes it possible for a touch screen user to immediately verify that the user is pressing the correct key on a virtual input device (such as a soft-keyboard) even if the user's finger (or other stimulus, such as a stylus) covers or partially obscures the image of the virtual key. In one embodiment, the glow touch feedback is displayed by momentarily illuminating the image of the virtual key pressed by the user. In alternate embodiments, the feedback is displayed by illuminating an area surrounding the image of the virtual key pressed by the user (e.g., a halo).

In further embodiments, the illumination may persist over a period of time. In addition, the illumination may display a fade-out effect wherein the illumination decreases over the same period of time. With a fade-out effect a user can readily verify which key was pressed without having to remove their focus from the keyboard.

In another embodiment, a generic glow effect can be used to indicate that a key press was registered without revealing which key was pressed.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1:
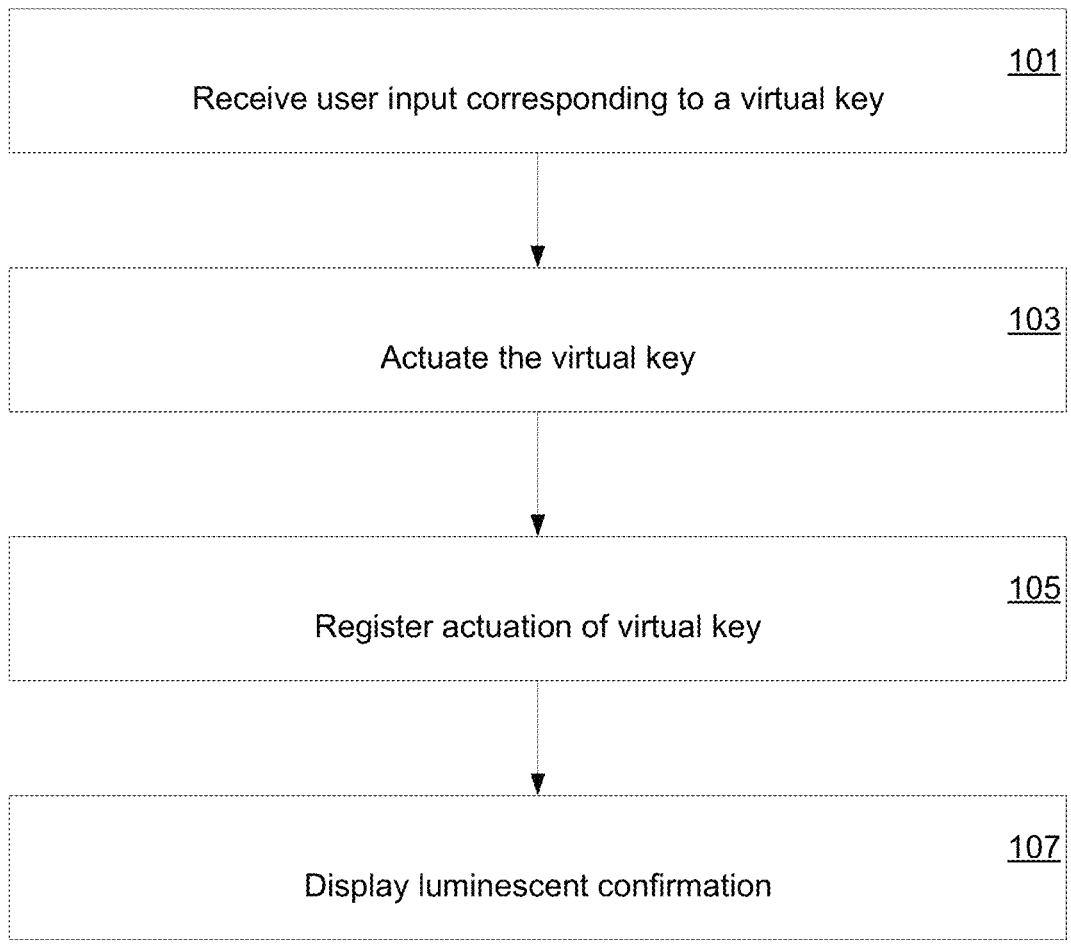
FIG. 1 is a flowchart describing the process of providing visual feedback in response to an actuation of a virtual key in a virtual keyboard, in accordance with various embodiments of the claimed subject matter.

Reference will now be made in detail to the preferred embodiments of the claimed subject matter, a method and system for the use of a reputation service provider, examples of which are illustrated in the accompanying drawings. While the claimed subject matter will be described in conjunction with the preferred embodiments, it will be understood that they are not intended to be limit to these embodiments. On the contrary, the claimed subject matter is intended to cover alternatives, modifications and equivalents, which may be included within the spirit and scope as defined by the appended claims.

Furthermore, in the following detailed descriptions of embodiments of the claimed subject matter, numerous specific details are set forth in order to provide a thorough understanding of the claimed subject matter. However, it will be recognized by one of ordinary skill in the art that the claimed subject matter may be practiced without these specific details. In other instances, well known methods, procedures, components, and circuits have not been described in detail as not to unnecessarily obscure aspects of the claimed subject matter.

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer generated step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present claimed subject matter, discussions utilizing terms such as "storing," "creating," "protecting," "receiving," "encrypting," "decrypting," "destroying," or the like, refer to the action and processes of a computer system or integrated circuit, or similar electronic computing device, including an embedded system, that manipulates and transforms data represented as physical (electronic) quantities within the computer system's registers and memories into other data similarly represented as physical quantities within the computer system memories or registers or other such information storage, transmission or display devices.

Accordingly, embodiments of the claimed subject matter provide a method and system for providing feedback in a touch screen device in response to an actuation of a virtual unit in a virtual input device. The claimed subject matter provides a method for providing luminescent feedback in response to an actuation of a virtual key in a virtual keyboard. User input in a virtual keyboard corresponding to a virtual key is received. The corresponding virtual key is actuated and registered in response to the user input, and a luminescent feedback is displayed to the user as confirmation of the actuation of the virtual key.

Providing Visual Feedback

FIG. 1 is a flowchart describing the process 100 of providing visual feedback in response to an actuation of a virtual key in a virtual keyboard, in accordance with various embodiments of the claimed subject matter. Steps 101-107 describe exemplary steps comprising the process 100 in accordance with the various embodiments herein described.

According to the process 100 of FIG. 1, user input corresponding to a virtual key is received at step 101. The user input may comprise, for example, a stimulus detected by the sensor in an area of a touch screen corresponding to a virtual key in a virtual keyboard or virtual keypad. Typical stimuli include a physical motion such as a touch or tap (or other physical contact) from a user's fingertip or stylus. Other stimulus motions include drawing motions, such as dragging the stimulus across one or more sensor areas (and virtual keys).

At step 103, the virtual key corresponding to the user-provided stimulus received in step 101 is actuated. In one embodiment, pre-apportioned areas of a touch screen surface may display image or graphical representation of one or more virtual keys. A stimulus detected in an image (or graphical representation) will be received as user input comprising an entry of the virtual key, and the virtual key is actuated.

At step 105, the actuation of the virtual key as performed in step 103 is registered by the touch screen. Data corresponding to an entry of the key represented by the virtual key actuated at step 103 is registered by the touch screen. For example, a stimulus corresponding to a press of the virtual key "9" will be registered as user input consisting of the number 9.

Finally, at step 107, a visible luminescent confirmation to the user that actuation of the virtual key as performed in step 103 and registered in step 105 was successfully performed is displayed to the user. The visible luminescent confirmation may be displayed as a momentary glow-type effect (e.g., a soft illumination). The glow effect may be displayed for example, in the image of the virtual key, such that the virtual key is distinguishable from other, unactuated virtual keys.

In one embodiment, once an actuation of a virtual key is registered, the luminescent confirmation is displayed instantly. In further embodiments, a virtual keyboard displays an image of a physical keyboard comprising a plurality of virtual keys. Each key image is further separated from other key images by a thin outline surrounding each key image. According to one embodiment, the luminescent confirmation may be displayed by illuminating the outline of an actuated virtual key image. In still further embodiments, a luminescent confirmation may be displayed in the areas between the images of a plurality of virtual keys within a certain proximity to the image of the actuated virtual key.

In further embodiments, other feedback may be provided along with the visual confirmation. For example, haptic feedback or audible feedback may be provided along with the luminescent confirmation. For instance, the touch screen device (e.g., mobile handset) may vibrate briefly or emit an audible sound, noise, or tone when a virtual key is actuated.

In still other embodiments, visual confirmation of an actuated virtual key may comprise adjusting the display size of the image of the virtual key, e.g., either increasing or decreasing the display size of the image of the actuated virtual key relative to the display size of the other images of virtual keys in the virtual keyboard, such that the image of the actuated virtual key is readily distinguishable from its unactuated state. In alternate embodiments, the virtual keyboard may comprise a virtual keypad or other virtual input device. In still further embodiments, the virtual key may comprise a button in a virtual toolbar, or other such object in an interface (e.g., a menu) capable of toggling.

Providing a luminescent confirmation corresponding to the specific virtual key once actuation is registered may not always be desirable. For example, in password entry fields, providing luminescent confirmation corresponding to the actuated virtual keys may compromise the security of the password protection. However, an indication that a key was actuated may still be desirable. Accordingly, in alternate embodiments, a luminescent confirmation corresponding to an actuation a virtual key is provided without visibly distinguishing the virtual key. According to these embodiments, the luminescent confirmation may, for example, be displayed by illuminating the areas surrounding all the virtual keys.

In another embodiment, the luminescent confirmation may be displayed by illuminating an outline surrounding the frame of the virtual keyboard. In still further embodiments, a user interface widget, such as actuation indicator, may be displayed. The actuation indicator may, for example, comprise an image located in a neutral position (e.g., lacking direct allusion to any specific virtual key). When any virtual key is actuated, the image of the actuation indicator may be briefly illuminated, and not illuminated at any other time.

By providing a luminescent confirmation, the user is able to verify both that a key is actuated according to a stimulus, and that the correct key was actuated by the stimulus without having to refer to the output field of the touch screen. This reduces the need to shift focus between the virtual keyboard and the output field of the touch screen, thereby increasing the ease and efficiency of user input entry.

In some embodiments, the luminescent confirmation provided in step 107 may be displayed temporarily for a pre-determined duration. By providing a luminescent confirmation that persists over a duration of time, the user is able to readily verify input preceding the currently actuated virtual key was received as intended.

In further embodiments, the intensity (e.g., brightness) of the luminescent confirmation decreases over the pre-determined duration. The intensity of the luminescent confirmation (e.g., the glow-type effect) may deteriorate over the pre-determined duration at a constant rate, thus displaying a "fade" effect. For example, an image of a virtual key may be illuminated in response to an actuation. The intensity of the image may decrease over time (e.g., two seconds), such that, at the termination of the illuminated period, the brightness of the image is no longer distinguishable from the brightness of other images in the virtual keyboard (e.g., the virtual keys revert to a constant brightness). By providing a luminescent confirmation that deteriorates over a duration of time, the user is able to verify input preceding the currently actuated virtual key was received as intended, and in the order as intended.

In still further embodiments, the above enumerated techniques for providing feedback for an actuation may be combined in whole or in part.

Exemplary Virtual Keypad

Figure 2A:
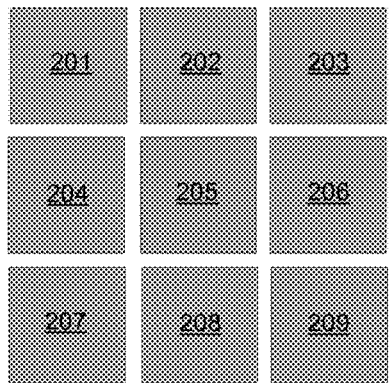
FIG. 2A is an illustration of a virtual keypad, in accordance with various embodiments of the claimed subject matter.

FIGS. 2A-2H are illustrations of a virtual keypad 200, in accordance with various embodiments of the claimed subject matter. As depicted, FIGS. 2A-2H include a virtual keypad 200, comprising images of a plurality of virtual keys (e.g., virtual key 201, 202, 203, 204, 205, 206, 207, 208 and 209). FIGS. 2A-2D depict illustrations of a virtual keypad 200 wherein a visual confirmation is displayed upon the actuation of a virtual key by illuminating the image of the actuated virtual key. FIG. 2A depicts a virtual keypad 200 prior to displaying a visual confirmation for an actuation.

Figure 2B:
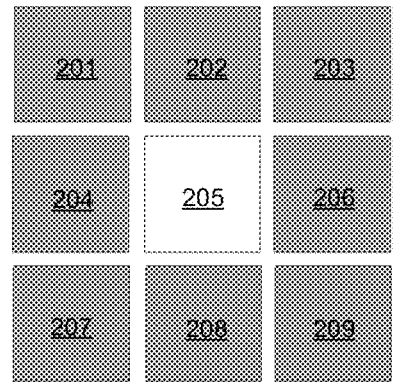
FIG. 2B is an illustration of a virtual keypad with an actuated key displaying a visual feedback in the image of the actuated key during a first period of time, in accordance with various embodiments of the claimed subject matter.

FIG. 2B is an illustration of the virtual keypad 200 with an actuated key 205 displaying a visual feedback in the image of the actuated key 205 during a first period of time, in accordance with various embodiments of the claimed subject matter. In one embodiment, the visual feedback is temporary. As depicted in FIG. 2B, the intensity of the illumination of the virtual key 205 deteriorates over time. FIG. 2B depicts the time the visual feedback is first displayed, and the time the feedback is displayed with the greatest intensity.

Figure 2C:
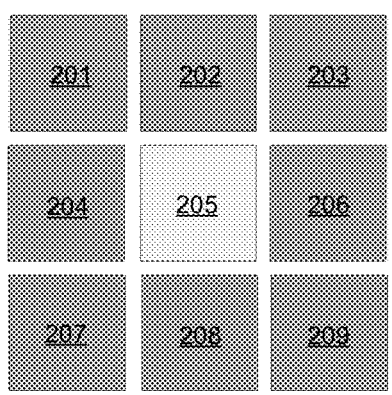
FIG. 2C is an illustration of a virtual keypad with an actuated key displaying visual feedback in the image of the actuated key during a second period of time, in accordance with various embodiments of the claimed subject matter.

FIG. 2C is an illustration of the virtual keypad 200 with an actuated key 205 displaying visual feedback in the image of the actuated key 205 during a second period of time, in accordance with various embodiments of the claimed subject matter. FIG. 2C depicts the continued deterioration of the intensity of the illumination of the image of virtual key 205 over time. FIG. 2C depicts a second period of time after the first period of time, wherein the intensity of the illumination of the image of virtual key 205 has deteriorated below the intensity of the illumination displayed during the first period of time.

Figure 2D:
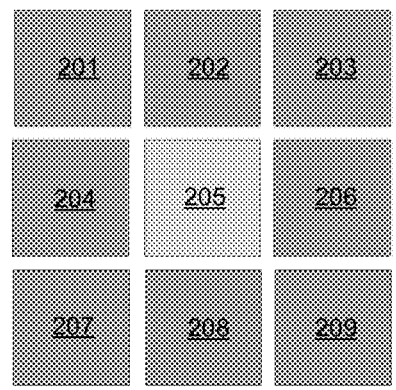
FIG. 2D is an illustration of a virtual keypad with an actuated key displaying visual feedback in the image of the actuated key during a third period of time, in accordance with various embodiments of the claimed subject matter.

FIG. 2D is an illustration of a virtual keypad 205 with an actuated key 205 displaying visual feedback in the image of the actuated key 205 during a third period of time, in accordance with various embodiments of the claimed subject matter. FIG. 2D depicts the continued deterioration of the intensity of the illumination of the image of virtual key 205 over time. FIG. 2D depicts a third period of time after the first and second periods of time, wherein the intensity of the illumination of the image of virtual key 205 has deteriorated below the intensities of the illumination displayed during the first and second periods of time.

Figure 2E:
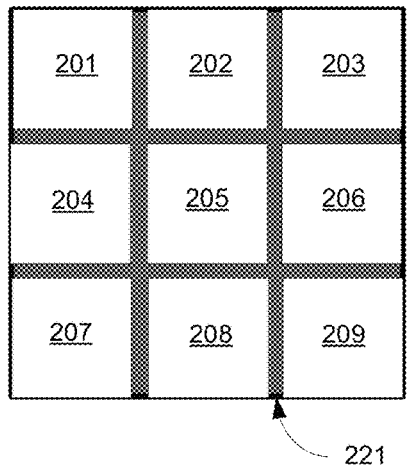
FIG. 2E is an alternate illustration of a virtual keypad, in accordance with various embodiments of the claimed subject matter.

FIG. 2E is an alternate illustration of a virtual keypad 200, in accordance with various embodiments of the claimed subject matter. FIGS. 2E-2H depict illustrations of a virtual keypad 200 wherein a visual confirmation is displayed upon the actuation of a virtual key by illuminating the area surrounding the image of the actuated virtual key, between the image of the actuated virtual key and the images of other, adjacent virtual keys. FIG. 2E depicts a virtual keypad 200 prior to displaying a visual confirmation of an actuation.

Figure 2F:
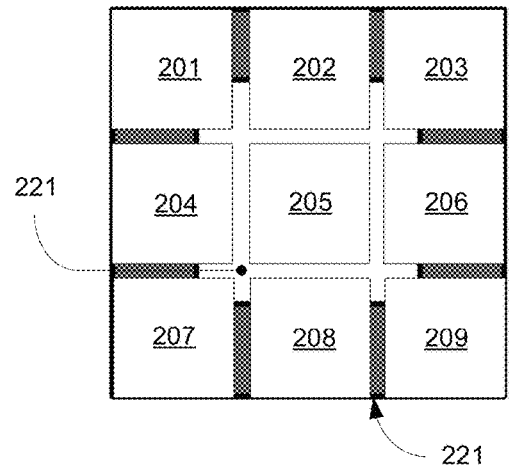
FIG. 2F is an illustration of a virtual keypad with an actuated key displaying a visual feedback in the area surrounding the actuated key during a fourth period of time, in accordance with various embodiments of the claimed subject matter.

FIG. 2F is an illustration of a virtual keypad 200 with an actuated key 205 displaying a visual feedback in the area surrounding the image of the actuated virtual key 205 during a fourth period of time, in accordance with various embodiments of the claimed subject matter. In one embodiment, the visual feedback is temporary. As depicted in FIG. 2F, the intensity of the illumination of the area surrounding the actuated virtual key 205 deteriorates over time. FIG. 2F depicts the time the visual feedback is first displayed, and the time the feedback is displayed with the greatest intensity.

Figure 2G:
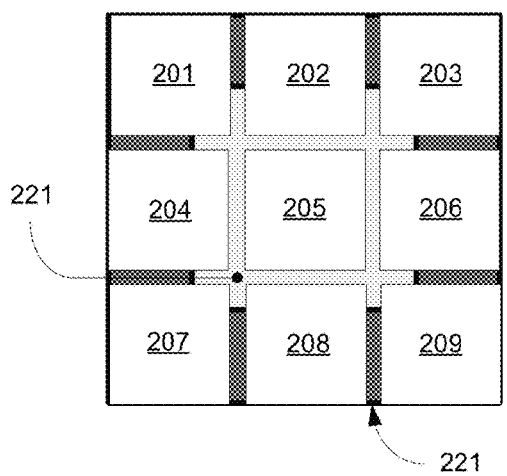
FIG. 2G is an illustration of a virtual keypad with an actuated key displaying a visual feedback in the area surrounding the actuated key during a fifth period of time, in accordance with various embodiments of the claimed subject matter.

FIG. 2G is an illustration of a virtual keypad 200 with an actuated key 205 displaying a visual feedback in the area surrounding the actuated key 205 during a fifth period of time, in accordance with various embodiments of the claimed subject matter. FIG. 2G depicts the continued deterioration of the intensity of the illumination of the area surrounding the image of the virtual key 205 over time. FIG. 2G depicts a fifth period of time after the fourth period of time, wherein the intensity of the illumination of the image of virtual key 205 has deteriorated below the intensity of the illumination displayed during the fourth period of time.

Figure 2H:
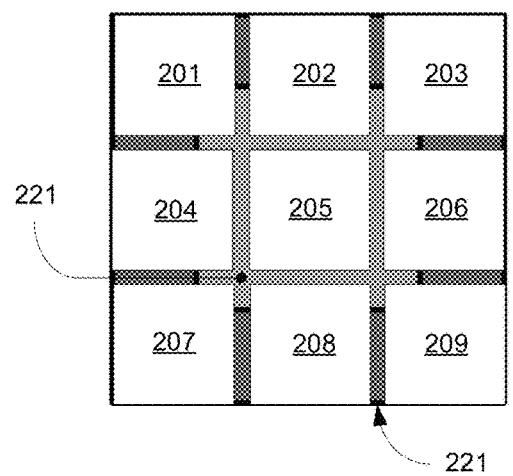
FIG. 2H is an illustration of a virtual keypad with an actuated key displaying a visual feedback in the area surrounding the actuated key during a sixth period of time, in accordance with various embodiments of the claimed subject matter.

FIG. 2H is an illustration of a virtual keypad 200 with an actuated key 205 displaying a visual feedback in the area surrounding the actuated key during a sixth period of time, in accordance with various embodiments of the claimed subject matter. FIG. 2H depicts the continued deterioration of the intensity of the illumination of the area surrounding the image of the virtual key 205 over time. FIG. 2H depicts a sixth period of time after the fourth and fifth periods of time, wherein the intensity of the illumination of the image of virtual key 205 has deteriorated below the intensities of the illumination displayed during the fourth and fifth periods of time.

Exemplary Virtual Keyboard

Figure 3A:
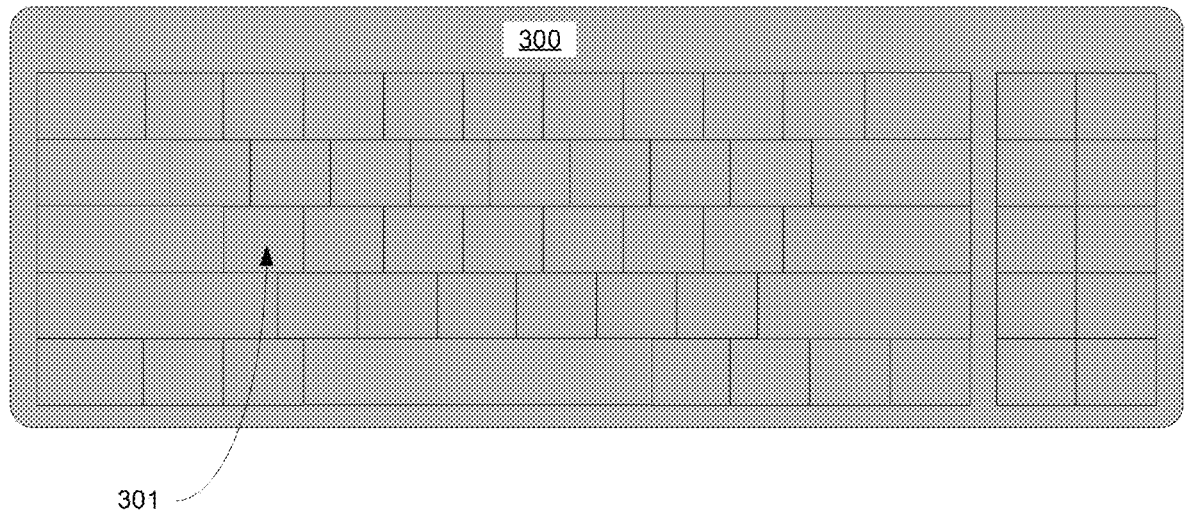
FIG. 3A is an illustration of a virtual keyboard, in accordance with various embodiments of the claimed subject matter.

FIGS. 3A-3J are illustrations of a virtual keyboard 300 in accordance with various embodiments of the claimed subject matter. As depicted, FIGS. 3A-3J include a virtual keyboard 300, comprising images of a plurality of virtual keys (e.g., virtual key 301). FIG. 3A depicts a virtual keyboard 300 prior to displaying a visual confirmation for an actuation.

Figure 3B:
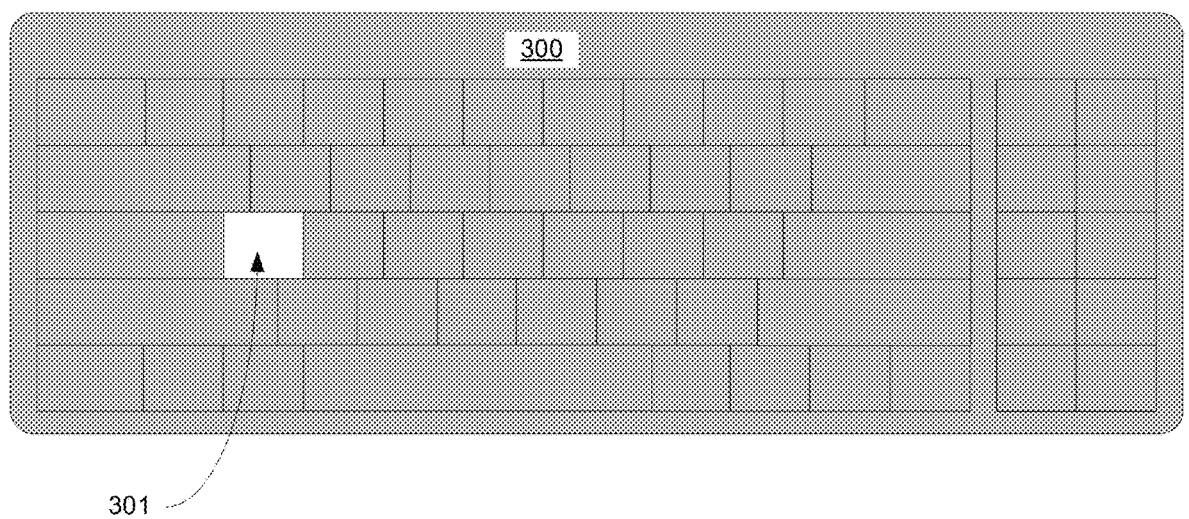
FIG. 3B is an illustration of a virtual keyboard with an actuated key displaying a visual feedback in the image of the actuated key, in accordance with various embodiments of the claimed subject matter.

FIG. 3B is an illustration of a virtual keyboard 300 with an actuated key 301 displaying a visual feedback in the image of the actuated key 301, in accordance with various embodiments of the claimed subject matter. As depicted in FIG. 3B, the visual feedback may consist of, for example, an illumination of the image of the actuated key 301. According to some embodiments, the visual feedback may persist for a period of time, and may also deteriorate over the period of time, in the manner as previously described.

Figure 3C:
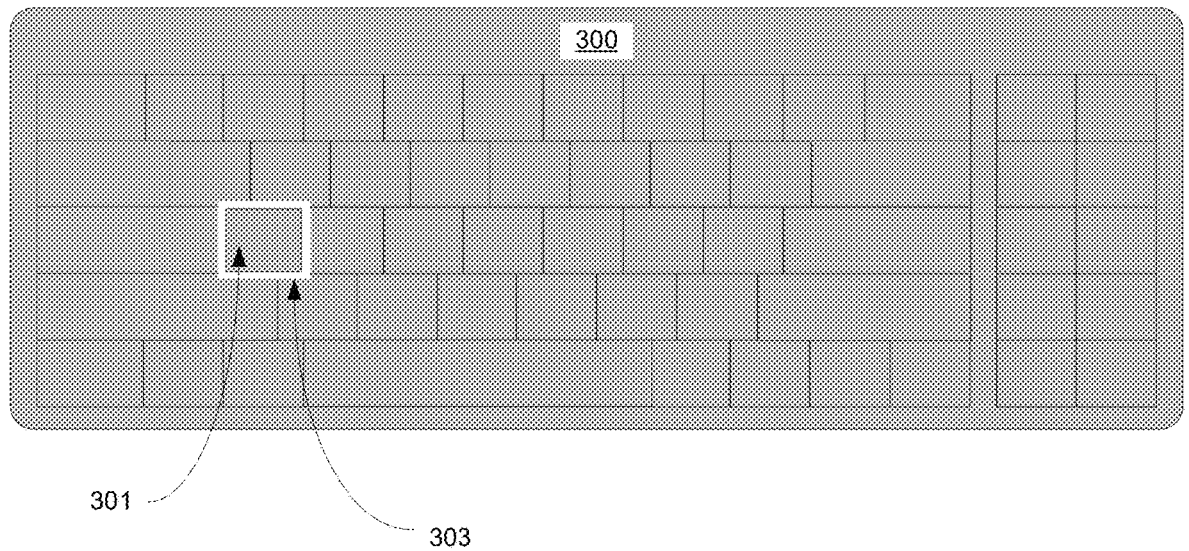
FIG. 3C is an illustration of a virtual keyboard with an actuated key displaying visual feedback comprising a halo in the image of the actuated key, in accordance with various embodiments of the claimed subject matter.

FIG. 3C is an illustration of a virtual keyboard 300 with an actuated key 301 displaying a visual feedback comprising a halo in the image of the actuated key, in accordance with various embodiments of the claimed subject matter. As depicted in FIG. 3C, the visual feedback may consist of, for example, an illumination of the immediate area surrounding the image of the actuated key 301, between the image of the actuated key 301 and the images of other, adjacent virtual keys. According to some embodiments, the visual feedback may persist for a period of time, and may also deteriorate over the period of time, in the manner as previously described.

Figure 3D:
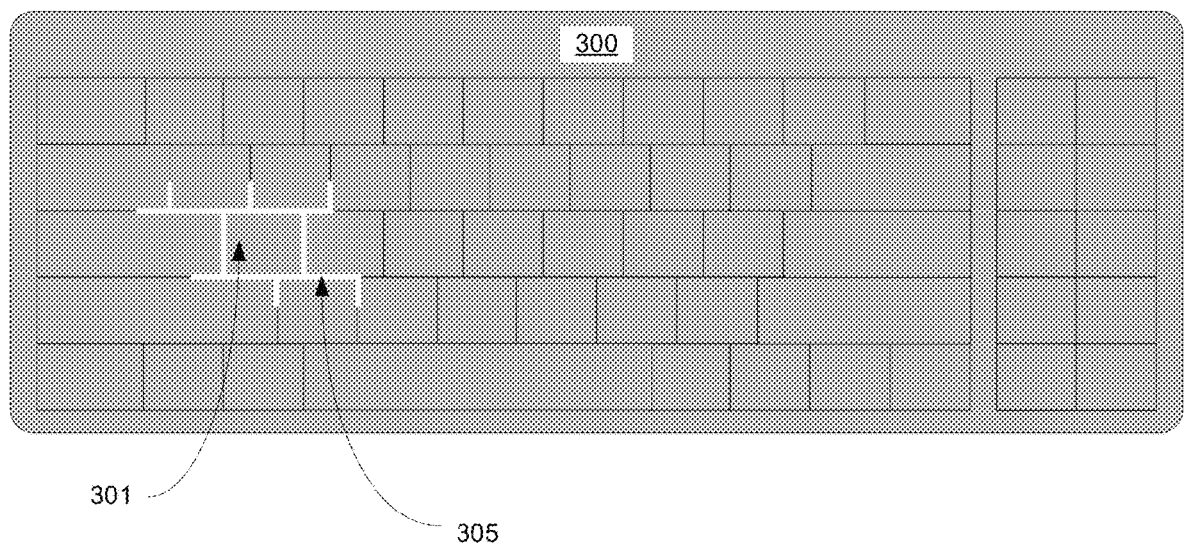
FIG. 3D is an illustration of a virtual keyboard with an actuated key displaying visual feedback in the area proximate to the image of the actuated key, in accordance with various embodiments of the claimed subject matter.

FIG. 3D is an illustration of a virtual keyboard 300 with an actuated key 301 displaying a visual feedback in the area proximate to the image of the actuated key 301, in accordance with various embodiments of the claimed subject matter. As depicted in FIG. 3D, the visual feedback may consist of, for example, an illumination of the image of the actuated key 301 and the area between the image of the actuated key 301 and the images of other, adjacent virtual keys proximate to the image of the actuated key 301 and over a certain radius. According to some embodiments, the visual feedback may persist for a period of time, and may also deteriorate over the period of time, in the manner as previously described.

Figure 3E:
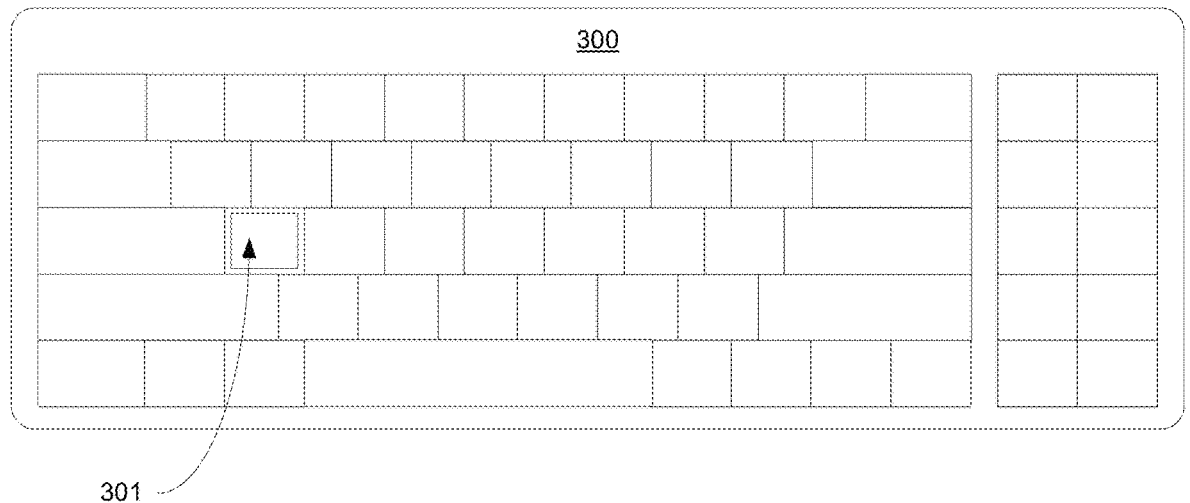
FIG. 3E is an illustration of a virtual keyboard with an actuated key with an image having a decreased size in response to an actuation, in accordance with various embodiments of the claimed subject matter.

FIG. 3E is an illustration of a virtual keyboard 300 with an actuated key 301 with an image having a decreased size in response to an actuation, in accordance with various embodiments of the claimed subject matter. As depicted in FIG. 3E, the image of the actuated key 301 is decreased in size relative to an original state, and relative to the images of other, unactuated keys in the virtual keyboard 300. In some embodiments, adjacent images of other, adjacent, unactuated keys may be enlarged such that the total area and dimensions of the virtual keyboard 300 remains constant. In other embodiments, the area between the image of the actuated key 301 and adjacent images of other, adjacent, unactuated keys increases in size such that the total area and dimensions of the keyboard 300 remains constant.

According to some embodiments, the visual feedback may persist for a period of time, and may also deteriorate over the period of time. For example, the size of the image of the actuated key 301 may increase in size at a constant rate over the period of time such that, at the end of the deterioration, the size of the image is equivalent to the size of the image in its original, unactuated state.

Figure 3F:
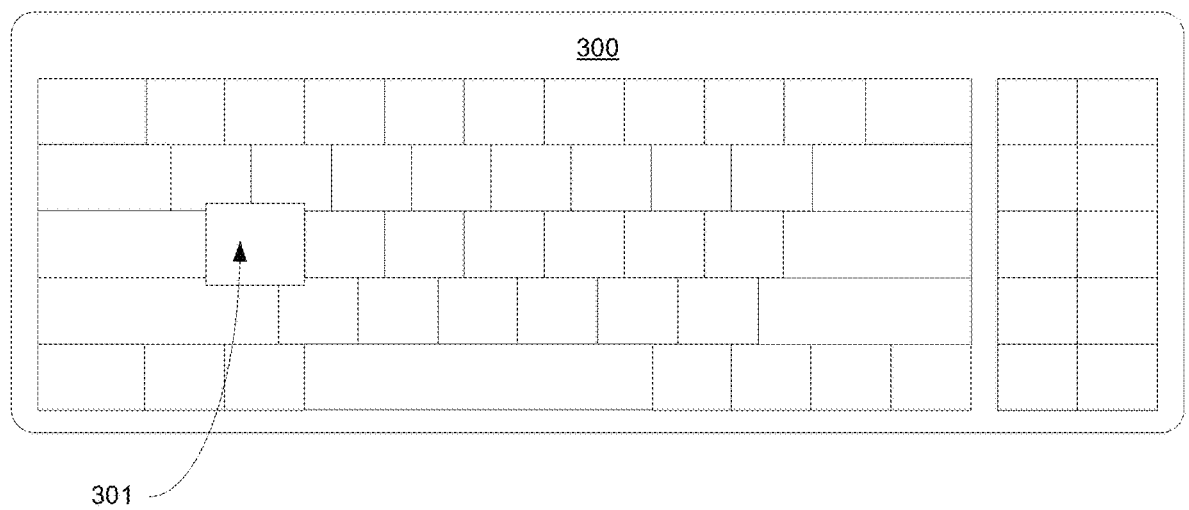
FIG. 3F is an illustration of a virtual keyboard with an actuated key with an image having an increased size in response to an actuation, in accordance with various embodiments of the claimed subject matter.

FIG. 3F is an illustration of a virtual keyboard 300 with an actuated key 301 with an image having an increased size in response to an actuation, in accordance with various embodiments of the claimed subject matter. As depicted in FIG. 3F, the image of the actuated key 301 is increased in size relative to an original state, and relative to the images of other, unactuated keys in the virtual keyboard 300. In some embodiments, adjacent images of other, adjacent, unactuated keys may be reduced such that the total area and dimensions of the virtual keyboard 300 remains constant.

According to some embodiments, the visual feedback may persist for a period of time, and may also deteriorate over the period of time. For example, the size of the image of the actuated key 301 may decrease in size at a constant rate over the period of time such that, at the end of the deterioration, the size of the image is equivalent to the size of the image in its original, unactuated state.

Figure 3G:
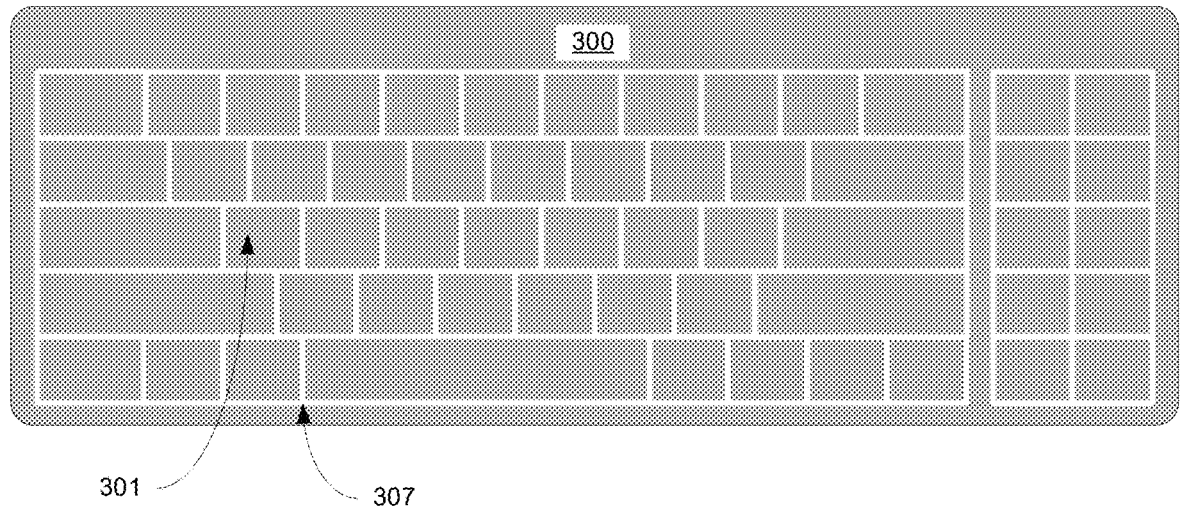
FIG. 3G is an illustration of a virtual keyboard displaying a visual feedback in the area surrounding the virtual keys comprising the virtual keyboard in response to an actuation of a key, in accordance with various embodiments of the claimed subject matter.

FIG. 3G is an illustration of a virtual keyboard 300 displaying a visual feedback in the area surrounding the virtual keys comprising the virtual keyboard in response to an actuation of a key, in accordance with various embodiments of the claimed subject matter. FIG. 3G depicts an embodiment wherein the specific indication of an actuated virtual key is undesirable (e.g., in a password or other such security field).

As depicted in FIG. 3G, the visual feedback may consist of, for example, an illumination of the area surrounding each of the virtual keys comprising the virtual keyboard. According to some embodiments, the visual feedback may persist for a period of time, and may also deteriorate over the period of time, in the manner as previously described.

Figure 3H:
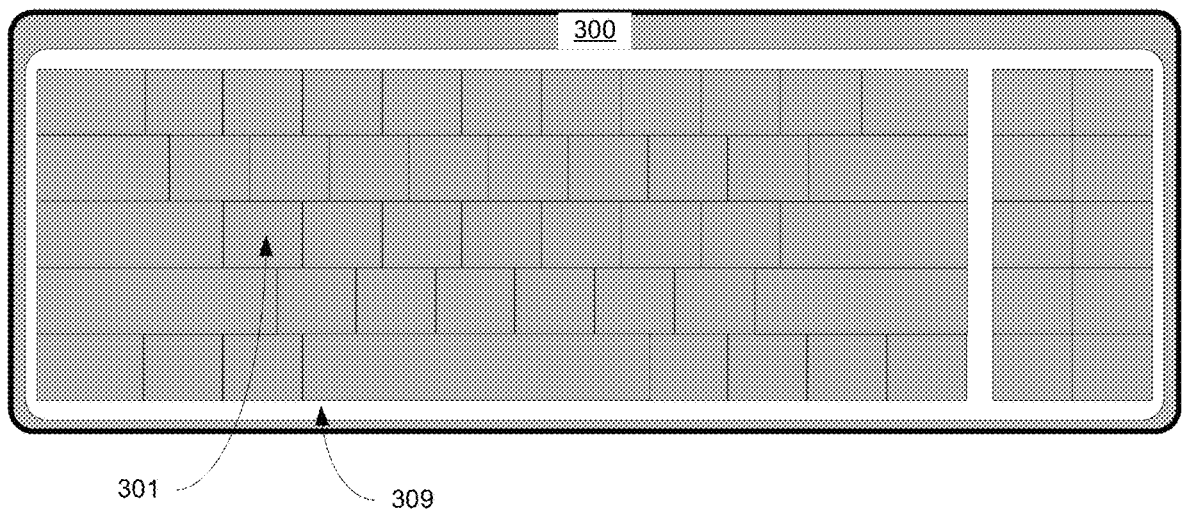
FIG. 3H is an illustration of a virtual keyboard displaying a visual feedback in the area surrounding the virtual keyboard in response to an actuation of a key, in accordance with various embodiments of the claimed subject matter.

FIG. 3H is an illustration of a virtual keyboard 300 displaying a visual feedback in the area surrounding the virtual keyboard 300 in response to an actuation of a key, in accordance with various embodiments of the claimed subject matter.

As depicted in FIG. 3H, the visual feedback may consist of, for example, an illumination of the area surrounding the frame of the virtual keyboard 300. According to some embodiments, the visual feedback may persist for a period of time, and may also deteriorate over the period of time, in the manner as previously described.

Figure 3I:
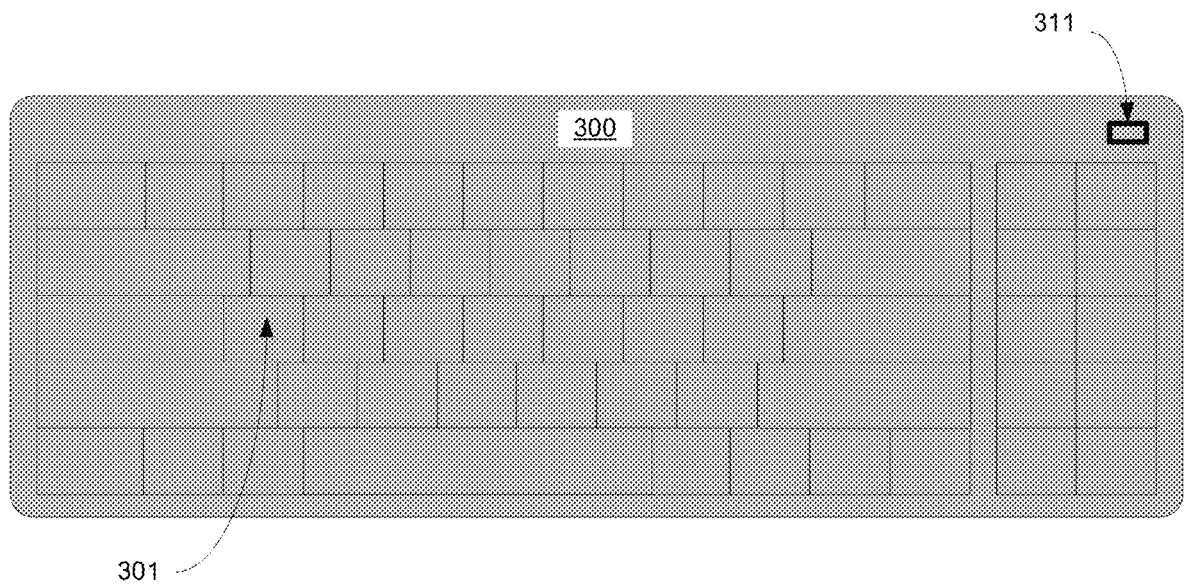
FIG. 3I is an illustration of a virtual keyboard with an actuation indicator, in accordance with various embodiments of the claimed subject matter.

FIG. 3I is an illustration of a virtual keyboard 300 with an actuation indicator 311, in accordance with various embodiments of the claimed subject matter. FIG. 3I depicts an actuation indicator 311 prior to displaying a visual confirmation for an actuation.

Figure 3J:
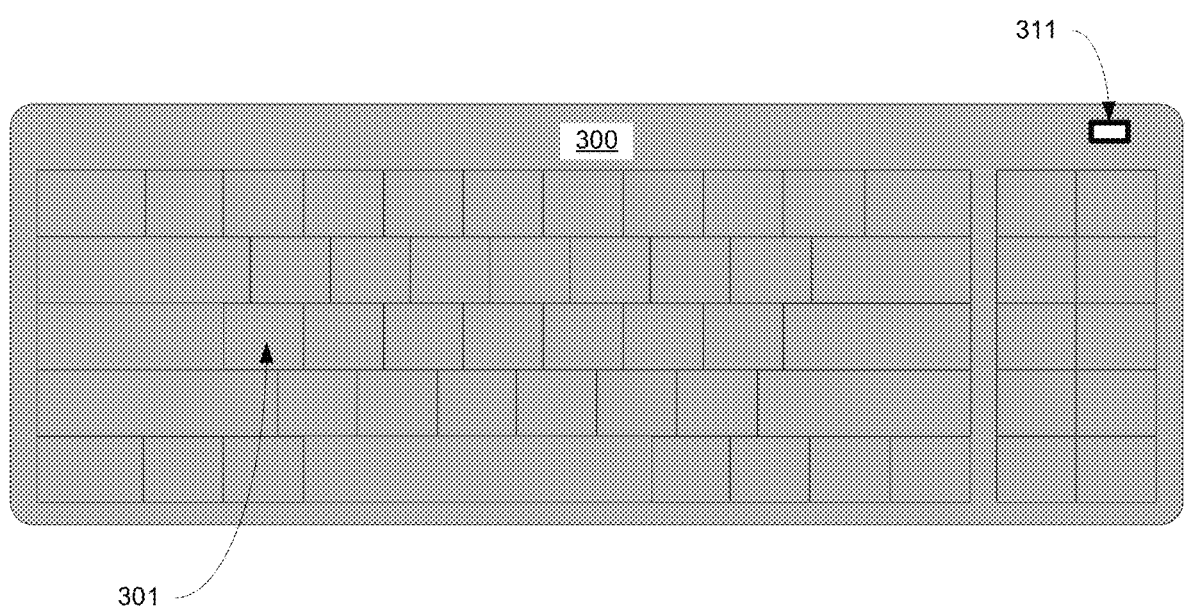
FIG. 3J is an illustration of a virtual keyboard with an actuation indicator displaying a visual feedback in response to an actuation of a virtual key, in accordance with various embodiments of the claimed subject matter.

FIG. 3J is an illustration of a virtual keyboard 300 with an actuation indicator 311 displaying a visual feedback in response to an actuation of a virtual key, in accordance with various embodiments of the claimed subject matter. In still further embodiments. As depicted in FIG. 3J, the visual feedback may consist of, for example, an illumination of the actuation indicator 311. In one embodiment, the actuation indicator 311 is a user interface widget. In other embodiments, actuation indicator 311 may comprise a light-emitting diode (LED) on the surface of the touch screen device. In one embodiment, when an actuation of any virtual key is registered or detected, the actuation indicator 311 may illuminate briefly, and may remain dormant (e.g., un-illuminated) at any other time.

While the feedback has been described as visual feedback, and in particular, luminescent feedback, other techniques for providing feedback have been previously described and may be incorporated as additional embodiments.

Basic Computing Device

Figure 4:
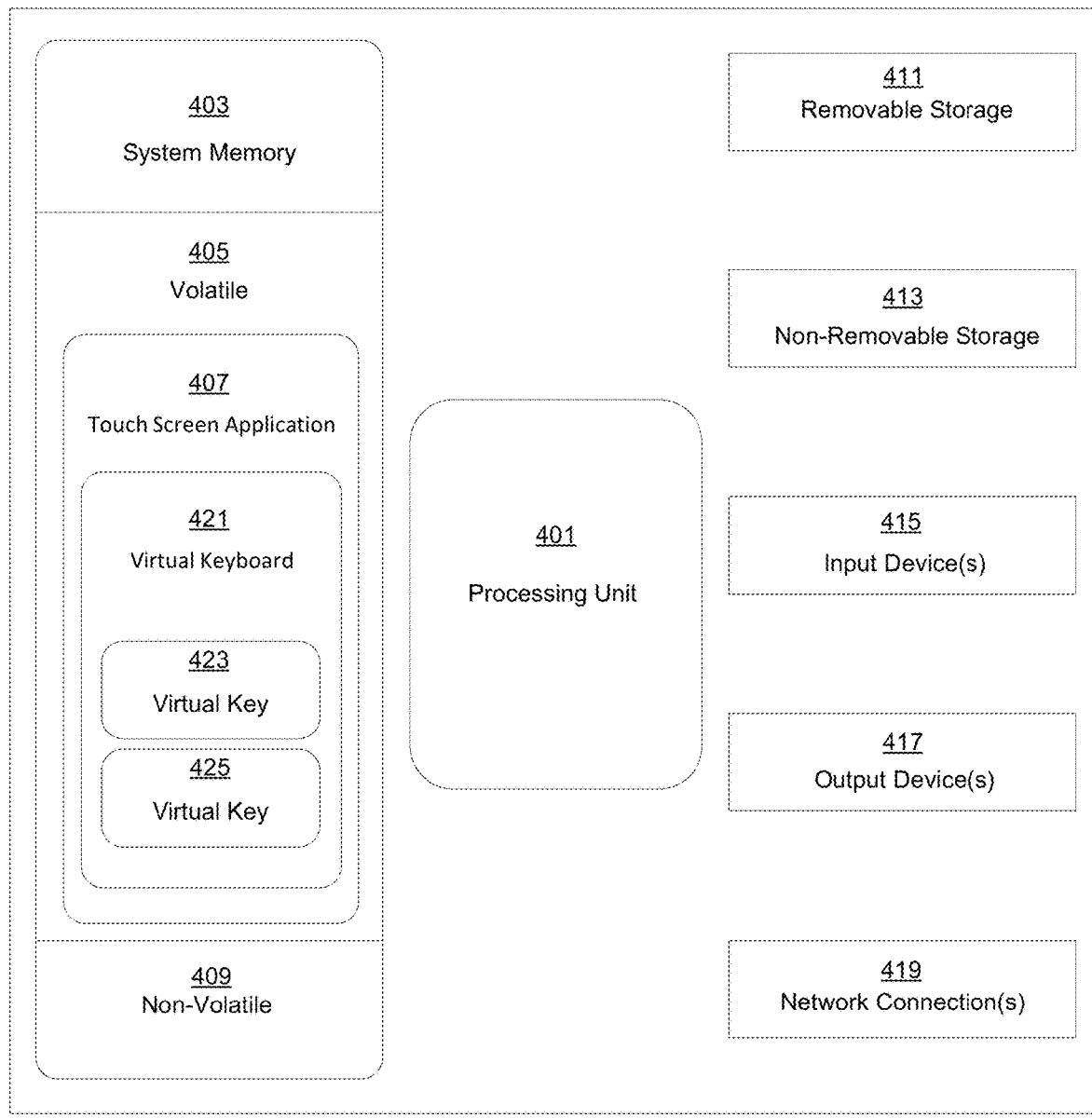
FIG. 4 shows an exemplary computing device 400 according to various embodiments.

FIG. 4 shows an exemplary computing device 400 according to various embodiments. Computing device 400 depicts the components of a basic computer system providing the execution platform for certain software-based functionality in accordance with various embodiments. Computing device 400 can be an environment upon which a touch screen application from various embodiments is instantiated.

Computing device 400 can be implemented as, for example, a desktop computer system, laptop computer system or server computer system. Similarly, computing device 400 can be implemented as a handheld device (e.g., cellphone, etc.) Computing device 400 typically includes at least some form of computer readable media. Computer readable media can be a number of different types of available media that can be accessed by computing device 400 and can include, but is not limited to, computer storage media.

In its most basic configuration, computing device 400 typically includes processing unit 401 and memory 403. Depending on the exact configuration and type of computing device 400 that is used, memory 403 can be volatile (such as RAM) 405, non-volatile 409 (such as ROM, flash memory, etc.) or some combination of the two. In one embodiment, touch screen application 407 is instantiated in the volatile memory 405. Touch screen application 407 may include virtual keyboard 421, which may comprise a plurality of virtual keys (e.g., virtual key 423, 425). In alternative embodiments, touch screen application 407 and its underlying components may be implemented in whole or in part in non-volatile memory 409.

Additionally, computing device 400 can include mass storage systems (removable 411 and/or non-removable 413) such as magnetic or optical disks or tape. Similarly, computing device 400 can include input devices 415 and/or output devices 417 (e.g., such as a display). Additionally, computing device 400 can include network connections 419 to other devices, computers, networks, servers, etc. using either wired or wireless media. As all of these devices are well known in the art, they need not be discussed in detail.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of providing visual feedback in response to an actuation of a virtual key, comprising:
    detecting user input corresponding to the virtual key, a plurality of virtual keys comprising the virtual key being displayed on a touch screen; and
    displaying, on the touch screen, visual confirmation in response to detection of the user input corresponding to the virtual key for a period of time, the visual confirmation comprises a visual distinction in light emitted for the virtual key relative to light emitted for other virtual keys in the plurality of virtual keys for the period of time, wherein the light emitted for the virtual key is the same as the light emitted for the other virtual keys in the plurality of virtual keys after the period of time.

2. The method of claim 1, wherein the user input comprises a physical contact of a finger in an area of the touch screen in which the virtual key is displayed.

3. The method of claim 1, wherein outlines separate the virtual keys.

4. The method of claim 1, wherein the period of time during which the visual confirmation is displayed is a pre-determined duration of time.

5. The method of claim 1, wherein a virtual keyboard comprises the plurality of virtual keys.

6. The method of claim 1, wherein a virtual keypad comprises the plurality of virtual keys.

7. The method of claim 1, further comprising:
    outputting haptic feedback along with the visual confirmation in response to the detection of the user input corresponding to the virtual key.

8. The method of claim 1, further comprising:
    outputting an audible indication along with the visual confirmation in response to the detection of the user input corresponding to the virtual key.

9. The method of claim 1, wherein the visual confirmation further comprises a visual indication of actuation of the virtual key in an area within proximity of the virtual key.

10. The method of claim 1, further comprising:
    displaying, on the touch screen, a character corresponding to the virtual key in an output field in response to the detection of the user input corresponding to the virtual key, wherein the output field is separate from the plurality of virtual keys on the touch screen.

11. The method of claim 1, wherein the light emitted for the virtual key is the same as the light emitted for the other virtual keys in the plurality of virtual keys before the detection of the user input corresponding to the virtual key.

12. A mobile computing device, comprising:
    a touch screen;
    a processor; and
    memory that comprises computer-executable instructions that, when executed by the processor, cause the processor to perform acts including:
        displaying a virtual keyboard on the touch screen, the virtual keyboard comprises virtual keys;
        detecting user input in an area of the touch screen in which a particular virtual key of the virtual keyboard is displayed; and
        displaying, on the touch screen for a period of time, visual confirmation in response to detection of the user input, the visual confirmation comprises a visual distinction in light emitted for the particular virtual key relative to light emitted for other virtual keys in the virtual keyboard for the period of time, wherein the light emitted for the particular virtual key is the same as the light emitted for the other virtual keys in the virtual keyboard after the period of time.

13. The mobile computing device of claim 12, wherein the user input comprises a physical contact of a finger in the area of the touch screen in which the particular virtual key is displayed.

14. The mobile computing device of claim 12, the memory further comprises computer-executable instructions that, when executed by the processor, cause the processor to perform acts including:
    outputting a haptic indication along with the visual confirmation in response to the detection of the user input.

15. The mobile computing device of claim 12, the memory further comprises computer-executable instructions that, when executed by the processor, cause the processor to perform acts including:
    outputting an audible indication along with the visual confirmation in response to the detection of the user input.

16. The mobile computing device of claim 12, wherein the visual confirmation further comprises a visual indication of actuation of the particular virtual key within proximity of the particular virtual key.

17. The mobile computing device of claim 12, the memory further comprises computer-executable instructions that, when executed by the processor, cause the processor to perform acts including:
    displaying, on the touch screen, a character corresponding to the particular virtual key in an output field in response to the detection of the user input, wherein the output field is separate from the virtual keyboard on the touch screen.

18. A mobile computing device, comprising:
a touch screen;
a processor; and
memory that comprises computer-executable instructions that, when executed by the processor, cause the processor to perform acts including:
- displaying virtual keys on the touch screen;
- detecting user input corresponding to a particular virtual key from the virtual keys displayed on the touch screen; and
- displaying, on the touch screen for a period of time, visual confirmation in response to detection of the user input corresponding to the particular virtual key, the visual confirmation comprises:
  - a visual distinction in light emitted for the particular virtual key relative to light emitted for other virtual keys displayed on the touch screen for the period of time; and
  - a visual indication of actuation of the particular virtual key within proximity of the particular virtual key.

19. The mobile computing device of claim 18, wherein the light emitted for the particular virtual key is the same as the light emitted for the other virtual keys displayed on the touch screen before the detection of the user input corresponding to the particular virtual key and after the period of time.

20. The mobile computing device of claim 18, the memory further comprises computer-executable instructions that, when executed by the processor, cause the processor to perform acts including:
- outputting a haptic indication and an audible indication along with the visual confirmation in response to the detection of the user input corresponding to the particular virtual key.

* * * * *